UNITED STATES PATENT OFFICE.

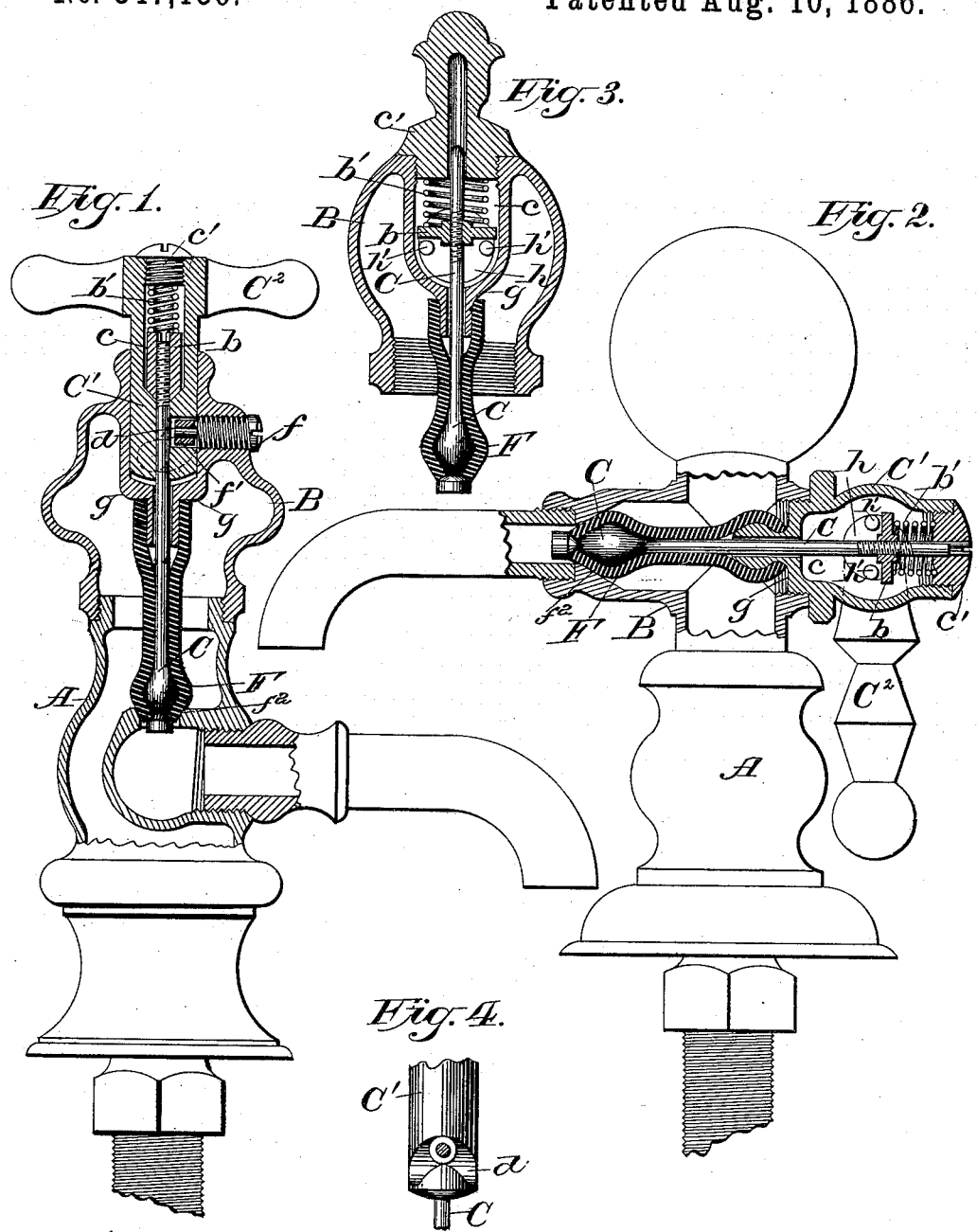

PHILIP A. BOWEN, OF MILWAUKEE, WISCONSIN, ASSIGNOR OF ONE-HALF TO LOEFFELHOLZ & CO., OF SAME PLACE.

FLUID-COCK.

SPECIFICATION forming part of Letters Patent No. 347,156, dated August 10, 1886.

Application filed March 17, 1885. Serial No. 159,172. (No model.)

*To all whom it may concern:*

Be it known that I, PHILIP A. BOWEN, of Milwaukee, in the county of Milwaukee, and in the State of Wisconsin, have invented certain new and useful Improvements in Fluid-Cocks; and I do hereby declare that the following is a full, clear, and exact description thereof.

My invention relates to water-cocks, and will be fully described hereinafter.

In the drawings, Figure 1 is a vertical longitudinal section of my invention. Fig. 2 is an elevation, partly in vertical section, of a modification of the same; and Figs. 3 and 4 are details.

A is the hollow stand that leads to the water-main.

B is a dome or valve-chamber that is fitted to the stand A.

C is a stem that extends up through the dome into a housing, C', in the handle C², and this housing, in turn, fits in a receptacle provided for it in the dome B. The opening in housing C', through which the stem C passes, terminates upwardly in an enlargement or receptacle, c, to receive a nut, b, that screws onto the upper end of the stem C, and above this is preferably placed a spring, b', for locking the nut b, the spring being in turn retained in position by the screw-nut c'.

The housing C' has an eccentric groove, d, in its side near its lower end, and through a screw-threaded opening in the dome I insert a screw, f, the inner end of which carries a sleeve or roller, f', that fits loosely in groove d, so that as the housing is turned by its handle it will be lifted or depressed by the roller or sleeve, and will thus open or close valve, F, which latter consists of a rubber sleeve that is stretched over the lower portion of stem C, which stem is enlarged at its lower end to give sufficient bulge to the valve to cause it to fit nicely in its seat f².

The elasticity of the rubber composing valve F, will have a constant tendency to press downward on the enlarged end of the stem, the upper end of its sleeve abutting against an enlargement or shoulder, g, of the dome, and thus the valve will close automatically when the handle C² is free; but if it is desired to lock the valve open the screw-nut c' is taken out, together with spring b', and by means of a screw-driver the nut b is turned to the right, so as to draw up the stem and lift the valve F from its seat.

The modifications shown merely adapt my device to other forms of cocks than that shown in Fig. 1, and differ from the latter principally in the means of opening the valve. In Figs. 2 and 3 the nut b is in the form of a disk, and the handle C² has a trunnion, h, that is fitted in one side of the dome, and it also has arms h' h', that bear against the inner side of the nut, so that when the handle is turned from a vertical position one of the arms will strike the nut and cause the stem to draw the valve F from its seat.

I am aware that an elastic sleeve has been applied upon a valve-stem, and that an eccentric slot has been provided in the face of a cylindrical valve; and I desire it to be understood that I do not broadly claim either of these elements. I believe, however, that I am the first to provide in a fluid-cock a self-closing valve and an eccentric slot and stud for adjustment of such valve; and also that I am the first to provide in a fluid cock a valve which ordinarily is self-closing, in connection with means by which such valve may be rendered non-self closing.

Having thus described my invention, what I claim as new, and desire to secure by Letters Patent, is—

1. In a fluid-cock, the combination of a stand or base, a valve-seat within the stand, a dome fitted upon the stand, a receptacle or recess within the dome, a housing within the receptacle, a cavity within the housing, a nut within the cavity, and having its seat at the inner extremity thereof, and a valve-stem, the outer end of which is engaged by the nut within the cavity, and the inner portion of which is incased by an elastic sleeve, substantially as set forth.

2. In a fluid-cock, the combination of a stand or base, a dome fitted upon the stand, a recess within the dome, a housing within the recess, a cavity within the housing, a nut within the cavity, and having its seat at the inner extremity thereof, a valve-stem which has an elastic sleeve upon its inner portion, and which is engaged upon its outer portion by the nut at the inner extremity of the cavity in the housing, a nut in the outer extremity of the housing, and a spring which extends from the nut upon the valve-stem to the nut in the outer extremity of the housing.

In testimony that I claim the foregoing I have hereunto set my hand, at Milwaukee, in the county of Milwaukee and State of Wisconsin, in the presence of two witnesses.

PHILIP A. BOWEN.

Witnesses:
S. S. STOUT,
H. G. UNDERWOOD.